United States Patent [19]

Bessey

[11] 4,282,945

[45] Aug. 11, 1981

[54] SUSPENSION MODIFYING DEVICE FOR LEAF SPRING SUSPENSIONS

[75] Inventor: Robert L. Bessey, Alto, Mich.

[73] Assignee: Grand Rapids Spring Service Co., Grand Rapids, Mich.

[21] Appl. No.: 117,102

[22] Filed: Jan. 31, 1980

[51] Int. Cl.$^3$ .............................................. B60G 11/10
[52] U.S. Cl. ...................................... 180/71; 180/233; 267/52; 267/66
[58] Field of Search ...................... 180/71, 73 R, 233; 267/52, 56, 66, 67, 68, 48

[56] References Cited

U.S. PATENT DOCUMENTS

| | | | |
|---|---|---|---|
| 1,923,361 | 8/1933 | Fowler | 267/48 |
| 2,201,531 | 5/1940 | Geb | 267/48 |
| 2,954,970 | 10/1960 | Bernard et al. | 267/48 X |
| 3,175,819 | 3/1965 | Mareno et al. | 267/66 X |
| 3,191,711 | 6/1965 | Conner | 180/71 |
| 3,194,580 | 7/1965 | Hamlet | 267/56 X |
| 3,305,230 | 2/1967 | Musser | 267/48 X |
| 3,420,544 | 1/1969 | Draves | 267/45 X |
| 3,704,876 | 12/1972 | Shubeck | 180/71 X |
| 3,788,629 | 1/1974 | Johnson | 180/71 X |
| 3,897,844 | 8/1975 | Chevalier | 180/71X |

*Primary Examiner*—John A. Pekar

*Attorney, Agent, or Firm*—Price, Heneveld, Huizenga & Cooper

[57] ABSTRACT

A combination traction bar chassis lift and suspension modifying device for four-wheel drive off road vehicles having leaf spring suspensions is provided comprising a longitudinally extending beam adapted to be clamped between the vehicle leaf spring and the axle of the vehicle for lifting the chassis of the vehicle. The beam comprises a plurality of longitudinally extending flexible leaf spring members. One end of the beam engages the vehicle leaf spring preventing wrap-up of the vehicle axle about the vehicle leaf spring during rapid acceleration or deceleration and stiffening the spring rate of the vehicle leaf spring during large suspension deflections. The beam is provided with means for engaging the vehicle leaf spring comprising a bifurcated member secured to the beam, the bifurcated member having first and second upstanding ends encompassing the sides of the vehicle leaf spring and first and second vertically spaced elastomer rollers for encompassing the top and bottom of the vehicle leaf spring. The vertically spaced rollers encompassing the vehicle spring facilitate longitudinal and vertical movement of the vehicle leaf spring during suspension deflections and thus provide an unmodified spring rate preserving the conventional ride of the vehicle under light load conditions.

5 Claims, 5 Drawing Figures

SUSPENSION MODIFYING DEVICE FOR LEAF SPRING SUSPENSIONS

BACKGROUND OF THE INVENTION

The invention relates generally to automotive vehicle suspension systems and more specifically, to a combination traction bar, chassis lifting device and suspension modifying device for four-wheel drive off road vehicles having leaf spring suspension.

In four-wheel drive vehicles used for heavy duty work such as off road transportation, snow plowing, or the like, it is common to fit the suspension of these vehicles with various spacing devices which raise the chassis of the vehicle for achieving greater ground clearance and allowing the use of larger traction improving tires. However, a problem attendant with the use of these various spacing devices and larger tires is increased axle wrap-up or wheel hop during rapid acceleration or deceleration of the vehicle. Axle wrap-up about the leaf spring of the vehicle can deleteriously effect the handling and steering of the vehicle. However, an even more serious problem occurs under maximum acceleration or the application of maximum braking force when the wheels of the vehicle are lifted by axle wrap-up to such an extent as to lose traction or spin, setting up a recurrent periodic lifting and dropping of the effected wheel which is commonly referred to as wheel hop. Not only is this phenomenon damaging to the tire surface, the drive train and the differential gearing, but acceleration or deceleration is degraded and the steering control of the vehicle is poor due to the uncentered forward thrust or rearward thrust generated by the effected wheel and due to the cyclic character of the impulse exerted by such an effected wheel. These problems are increased when spacing devices and larger tires are employed since the larger tires provide increased traction and the diameter of the tires provides an increased moment on the axle of the vehicle. Furthermore, the spacing devices themselves increase the moment felt by the vehicle leaf spring.

Heretofore, numerous approaches have been followed in modifying suspension systems employing leaf springs for various purposes. One prior art construction for preventing spring wrap-up in drag racing cars involve the mounting of a relatively rigid beam forwardly directed under each rear leaf spring of the vehicle. The rear and forward ends of the beam are pivotally secured to the axle housing and to the vehicle frame, respectively. Such a pivotally mounted beam is commonly referred to in the drag racing art as a radius rod type of traction bar. This arrangement compels the axle housing to swing about the forward pivot and thus prevents axle wrap-up about the leaf spring. Such devices can even be found with flexible beams or radius rods. However, these devices somewhat impair the ride of the vehicle and in the drag racing context, fail to compensate for the transfer of vehicle weight to one rear wheel mainly due to the torque reaction of the motor and fail to impair or avoid rear end squat during maximum acceleration.

More recently, a type of drag racing traction bar has been provided which comprises a longitudinally disposed rigid beam secured to the axle housing with a forward portion of the beam clamped under the forward half of the vehicle leaf spring. This traction bar effectively transfers weight from the front end of the vehicle to the rear wheels as torque is applied while holding the chassis up and substantially eliminating axle wrap-up. However, the ride of the vehicle is substantially impaired by such a device due to the rigidifying of part of each leaf spring, and again, in the drag racing context, no compensation is provided for the torque reaction of the motor. Furthermore, clamping of the traction bar to the vehicle leaf spring causes stress concentrations in the spring that can lead to spring failure, particularly when the vehicle is put to relatively heavy use. It is also known to employ such a device with a single thrust surface associated with the forwardly extending end of the traction bar beam for contacting the bottom surface of the leaf spring during acceleration and preventing axle wrap-up as a result thereof. These devices allow the spring to deflect in the usual manner under normal load conditions to preserve the rideability of the car. However, these devices do not solve the axle wrap-up problem or wheel hop problem associated with rapid deceleration. Still others of these devices have been provided with pairs of thrust surfaces disposed at the forward end of the beam above and below the forward end of the vehicle leaf spring for allowing some longitudinal and vertical displacement of the leaf spring under normal road conditions to preserve the rideability of the vehicle. This helps prevent axle wrap-up during deceleration and the thrust surfaces may be adjustable to compensate for torque induced loading of the rear wheels during the type of acceleration encountered in drag racing. However, these drag racing type traction bars are unsuitable for use in conjunction with the spacing devices normally used in four-wheel drive vehicles for increasing the ground clearance and allowing the use of larger traction increasing tires. Furthermore, these devices do not increase the load carrying capacity of the vehicle leaf spring as is often necessary when a four-wheel drive vehicle is used for off road transportation or snow plowing.

SUMMARY OF THE INVENTION

These and other problems in the prior art are solved by provision of a combination traction bar, chassis lift and suspension modifying device for four-wheel drive heavy duty vehicles having leaf spring suspensions. The device comprises a longitudinally extending beam adapted to be clamped between the vehicle leaf spring and axle for lifting the chassis of the vehicle and thus providing necessary ground and tire clearance. The beam is provided with first and second longitudinally opposed ends, the first end of the beam being clamped securely below the vehicle leaf spring between the vehicle leaf spring and the axle of the vehicle. The second end of the beam is provided with means for engaging the vehicle leaf spring and preventing wrap-up of the vehicle axle about the vehicle leaf spring during rapid acceleration or deceleration of the vehicle. The beam of the device comprises a plurality of longitudinally extending flexible leaf spring members for stiffening the spring rate of the vehicle leaf springs during large suspension deflections. The means for engaging the vehicle leaf spring comprises a bifurcated member secured to the second end of the beam. The bifurcated member is provided with first and second upstanding ends encompassing the sides of the forward portion of the vehicle leaf spring and first and second elastomer rollers encompassing the top and bottom of the vehicle leaf spring. The first and second rollers facilitate longitudinal and vertical movement of the vehicle leaf spring and thus provide an unmodified spring rate preserving the stock ride of the vehicle under light load conditions. Thus, in addition to providing needed chassis and tire clearance, the suspension modifying device of the present invention solves the spring wrap-up and wheel hop problem heretofore encountered when lift kits were used with larger tires providing increased traction. Furthermore, the device acts as a overload spring substantially stiffening the spring rate of the vehicle leaf springs during the type of large suspension deflections often encountered by fourwheel drive heavy duty vehicles of the type used for off road transportation, snowplowing, or the like. Yet, the device provides an unmodified spring rate for small suspension deflections that preserves the rideability and comfort of the vehicle under road conditions.

DESCRIPTION OF THE PREFERRED EMBODIMENTS

Figure 1:
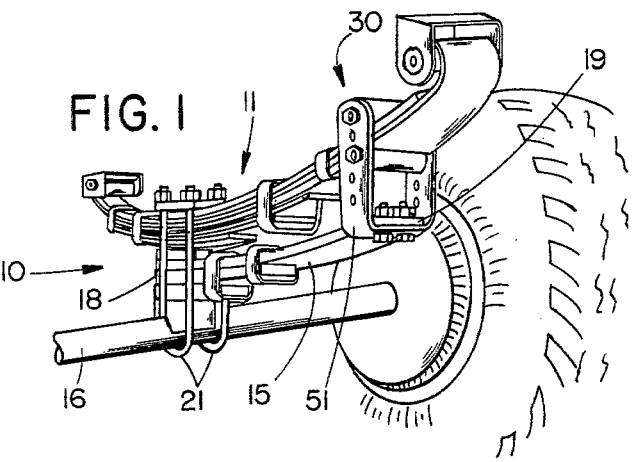
FIG. 1 is a perspective view of the traction modifying device of the present invention installed on a vehicle.
Figure 2:
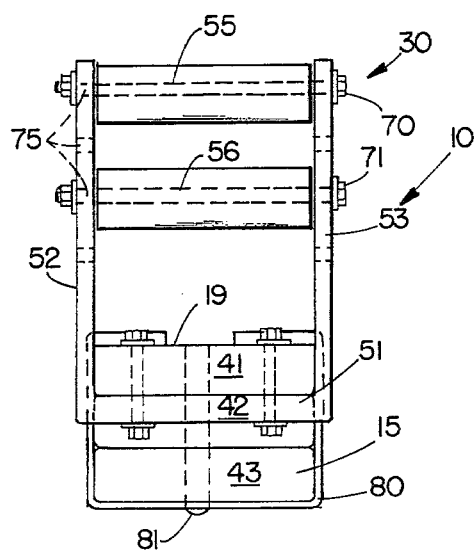
FIG. 2 is a front elevational view of the suspension modifying device of the present invention.
Figure 3:
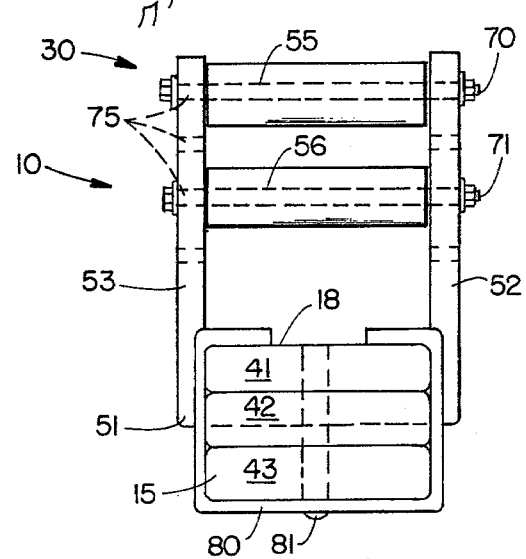
FIG. 3 is a rear elevational view of the suspension modifying device of the present invention.
Figure 4:
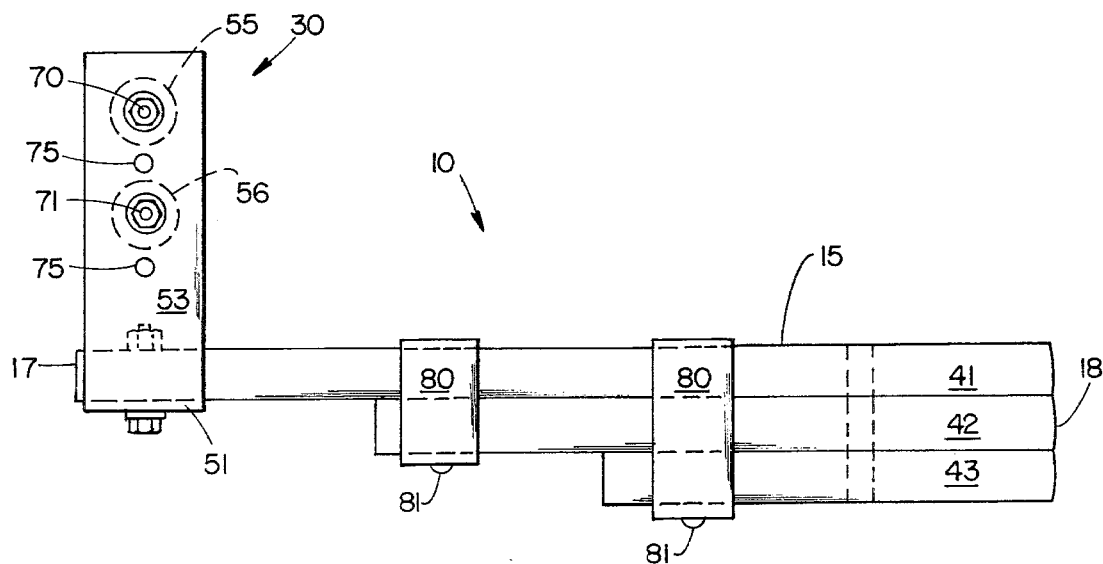
FIG. 4 is a side elevational view of the suspension modifying device of the present invention.
Figure 5:
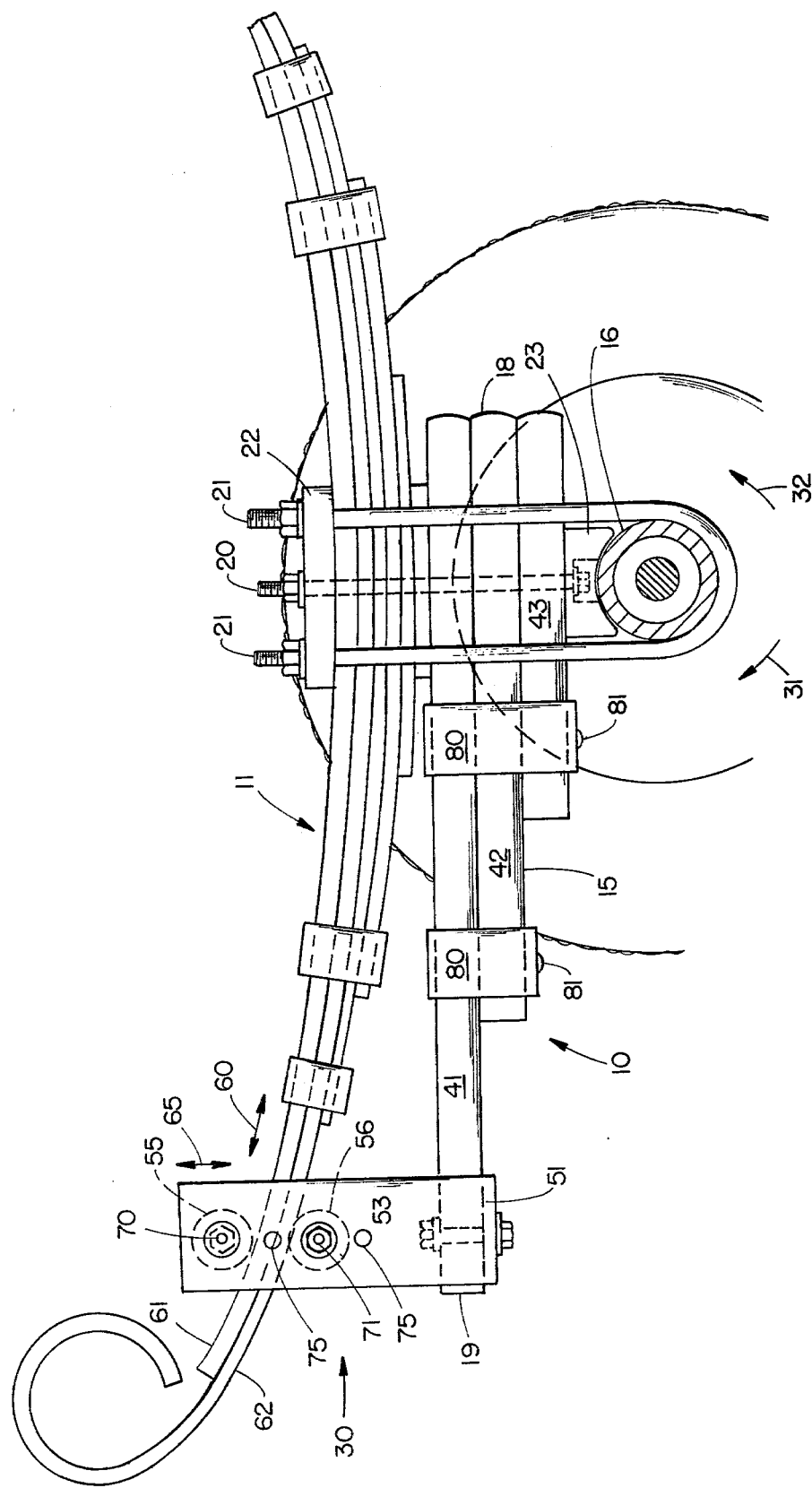
FIG. 5 is a side elevational view of the suspension modifying device of the present invention installed on a vehicle.

Referring now to the figures, and particularly FIG. 5, a combination traction bar, chassis lifting and suspension modifying device 10 is illustrated. The device 10 is particularly adapted for use on four-wheel drive heavy duty vehicles having leaf spring suspensions 11. The device 10 comprises a longitudinally extending beam 15 adapted to be clamped below the leaf spring 11 between the leaf spring 11 and the axle tube 16 of the vehicle. This effectively raises the chassis of the vehicle with respect to the vehicle axles to provide needed ground clearance and to provide clearance for larger traction increasing tires. The beam 15 is provided with first and second longitudinally opposed ends 18 and 19, respectively. The first end of the beam 18 is clamped between the vehicle leaf spring 11 and axle tube 16 by extended center bolts 20 and extended U-bolts 21. Other components involved in the clamping of the beam 15 between the vehicle leaf spring 11 and the axle tube 16 such as the pads 22 and 23 may be standard components.

One suspension modifying device 10 is provided for each of the four vehicle leaf springs of the vehicle and the beam 15 of each of the devices is adapted to extend forwardly with respect to the vehicle. The forward end or second end 19 of the beam 15 includes means at 30 for engaging the vehicle leaf spring 11 and thus preventing wrap-up of the vehicle axle tube 16 about the vehicle leaf spring 11 in the direction of the arrows 31 and 32 (in FIG. 5) during acceleration and deceleration of the vehicle, respectively. Thus, the suspension modifying device of the present invention solves any wrap-up or wheel hopping problems heretofore encountered with the use of suspension lifting devices and larger traction increasing tires. The use of after market tires having greater surface area and traction as well as a larger diameter substantially increases the moment applied to the axle tube 16 under maximum acceleration or deceleration. The forces created are greatest just before tire slippage when the coefficient of static friction between the road surface and the tire is the greatest. In addition to the increased moment applied to the axle tube 16 and thus the leaf spring 11 by these forces, the moment felt by the leaf spring 11 is larger yet due to the moment arm created by the increased distance between the axle and the spring of the vehicle. With prior art spacing devices or lift kits, these conditions frequently led to excessive axle wrap-up and wheel hop during periods of maximum acceleration or deceleration. This untenable condition previously encountered with the use of lift kits is eliminated by the traction modifying device 10 of the present invention.

Preferably, the beam 15 of the traction modifying device 10 comprises a plurality of longitudinally extending flexible leaf spring members 41, 42 and 43. The flexible leaf spring members 41 through 43 effectively stiffen the spring rate of the vehicle leaf spring 11 during large suspension deflections. This is generally a desirable effect in heavily loaded four-wheel drive vehicles such as pickups and the like which are to be used to carry heavy loads over rough terrain. Furthermore, this is often a desirable effect, particularly on the front wheels of a four-wheel drive vehicle of the type being used to drive a forwardly mounted snowplow.

The means 30 for engaging the vehicle leaf spring 11 preferably comprises a bifurcated member 51 bolted or otherwise suitably secured to the forward or second end 19 of the beam 15. The bifurcated member or strap 51 is provided with first and second upstanding ends 52 and 53 encompassing the sides of the vehicle leaf spring 11. The first and second upstanding ends 52 and 53 of the bifurcated member 51 include first and second vertically spaced bumpers 55 and 56 which are preferably a pair of vertically spaced elastomer rollers. The first and second bumpers or rollers 55 and 56 encompass the top and bottom of the vehicle leaf spring 11, respectively. The rollers 55 and 56 thereby facilitate longitudinal movement of the spring 11 in the direction of the arrow 60 in FIG. 5, helping to preserve the rideability of the vehicle. The rollers 55 and 56 may be adjusted, and preferably are so adjusted for off-road handling, to engage the top and bottom surfaces 61 and 62, respectively of the vehicle leaf spring 11 and thus positively eliminate wrap-up of the axle 16 about the vehicle leaf spring 11. However, the rollers 55 and 56 may be mounted between the ends 52 and 53 of the bifurcated member 51 to provide sufficient vertical spacing to allow some vertical movement of the spring 11 in the direction of the arrow 65 in FIG. 5 to provide a substantially unmodified spring rate during small suspension deflections. This effectively preserves the more comfortable stock ride of the vehicle during normal road conditions and often the rollers 55 and 56 are so positioned to provide a compromise between off-road handling and road riding comfort.

Preferably, the first and second elastomer rollers are journaled on first and second pins or bolts 70 and 71, respectively. The bifurcated member 51 is then provided with a plurality of apertures 75 through which the pins 70 and 71 may be mounted to vary the vertical spacing of the first and second rollers 55 and 56. In this manner, the rollers 55 and 56 may be used to encompass vehicle leaf springs 11 having various thicknesses. Furthermore, the rollers 55 and 56 may be adjusted for intimate contact with the top and bottom surfaces of the vehicle leaf spring 11 to achieve a maximum traction bar effect, insuring that the drive wheels remain in contact with the ground surface under all driving conditions and to provide a maximum spring stiffening effect in conjunction therewith. However, the adjustability of the rollers 55 and 56 also allows the operator to readjust the rollers, increasing the vertical spacing of the rollers to a street position where some vertical movement of the vehicle leaf spring 11 is provided to insure a comfortable ride. It should be noted that even when the rollers 55 and 56 are in intimate contact with the vehicle leaf spring 11, the fact that lateral motion of the vehicle leaf spring 11 is always provided for substantially decreases stress concentrations in the leaf spring 11 previously encountered with automotive drag racing traction bars of the type that securely clamp to the vehicle leaf spring 11.

The plurality of longitudinally extending flexible leaf spring members 41 through 43 making up the beam 15 of the traction modifying device 10 preferably are secured together with a plurality of spring clips 80 that are riveted or otherwise suitably secured to the beam 15 by fasteners 81.

It is to be understood that the dimensions and mounting hardware of the traction modifying device of the present invention may change depending on the type of vehicle, the size of leaf springs, and the desired suspension lift required. Thus, the above description should be considered as exemplary and that of the preferred embodiment only. The true spirit and scope of the present invention should be determined by reference to the appended claims. It is desired to include within the appended claims all such modifications of the invention that come within the proper scope of the invention.

The embodiments of the invention in which an exclusive property or privilege is claimed are defined as follows:

1. A combination traction bar, chassis lifting, and suspension modifying device for four-wheel drive heavy duty vehicles having leaf spring suspensions comprising:
   a longitudinally extending beam adapted to be clamped below a vehicle leaf spring between the vehicle leaf spring and axle of a vehicle for lifting the chassis of the vehicle, said beam having first and second longitudinally opposed ends, said first end of said beam being clamped between the vehicle leaf spring and axle of the vehicle;
   means for engaging the vehicle leaf spring disposed on said second end of said beam to prevent wrap-up of the vehicle axle about the vehicle leaf spring during rapid acceleration or deceleration;
   said means for engaging the vehicle leaf spring comprising a bifurcated member secured to said second end of said beam, said bifurcated member having first and second upstanding ends encompassing the sides of the vehicle leaf spring and first and second vertically spaced bumpers encompassing the top and bottom of the vehicle leaf spring to facilitate longitudinal and vertical movement of the vehicle leaf spring and thus provide an unmodified spring rate preserving the ride of the vehicle under light load conditions.

2. A combination traction bar, chassis lifting and suspension modifying device for four-wheel drive heavy duty vehicles having leaf spring suspensions comprising:
   a longitudinally extending beam adapted to be clamped below a vehicle leaf spring, between the vehicle leaf spring and axle of a vehicle for lifting the chassis of the vehicle, said beam having first and second longitudinally opposed ends, said first end of said beam being clamped between the vehicle leaf spring and axle of the vehicle;
   means for engaging the vehicle leaf spring disposed on said second end of said beam to prevent wrap-up of the vehicle axle about the vehicle leaf spring during rapid acceleration or deceleration;
   said beam comprising a plurality of longitudinally extending flexible leaf spring members for stiffening the spring rate of the vehicle leaf springs during large suspension deflections;
   said means for engaging the vehicle leaf spring comprising a bifurcated member secured to said second end of said beam, said bifurcated member having first and second upstanding ends encompassing the sides of the vehicle leaf spring and first and second vertically spaced elastomer rollers encompassing the top and bottom of the vehicle leaf spring to facilitate longitudinal and vertical movement of the vehicle leaf spring and thus provide an unmodified spring rate preserving the ride of the vehicle under light load conditions.

3. The combination traction bar, chassis lift and suspension modifying device of claim 2 wherein one of said devices is provided for each vehicle leaf spring, said beams of each of said devices being adapted to extend forwardly on the vehicle.

4. The combination traction bar, chassis lift and suspension modifying device of claim 3 wherein said first and second elastomer rollers are journaled on first and second pins, respectively, each of said first and second pins extending through apertures disposed in said first and second ends of said bifurcated members, said first and second ends of said bifurcated members being provided with a plurality of apertures for adjusting the vertical spacing of said first and second elastomer rollers to accommodate vehicle leaf springs of varying thicknesses and to provide a variable amount of suspension travel or spring wrap-up before said beams are loaded.

5. The combination traction bar, chassis lift and suspension modifying device of claim 4 further including a plurality of spring clips encompassing said plurality of longitudinally extending flexible leaf spring members of said beams, each of said spring clips being riveted to one of said plurality of longitudinally extending flexible leaf springs.

* * * * *